(12) United States Patent
Mui et al.

(10) Patent No.: US 9,143,537 B2
(45) Date of Patent: Sep. 22, 2015

(54) DEVICE REGISTRATION IN AN IMS NETWORK

(75) Inventors: Paul C. Mui, Countryside, IL (US); Bhaskara V. Batchu, Andhra Pradesh (IN)

(73) Assignee: Alcatel Lucent, Boulogne-Billancourt (FR)

( * ) Notice: Subject to any disclaimer, the term of this patent is extended or adjusted under 35 U.S.C. 154(b) by 1791 days.

(21) Appl. No.: 12/326,243

(22) Filed: Dec. 2, 2008

(65) Prior Publication Data

US 2010/0136970 A1    Jun. 3, 2010

(51) Int. Cl.
| G06F 15/16 | (2006.01) |
| H04L 12/28 | (2006.01) |
| H04W 4/00  | (2009.01) |
| H04L 29/06 | (2006.01) |
| H04L 29/08 | (2006.01) |
| H04W 8/04  | (2009.01) |

(52) U.S. Cl.
CPC ............ *H04L 65/1073* (2013.01); *H04L 29/06* (2013.01); *H04L 65/1006* (2013.01); *H04L 67/14* (2013.01); *H04L 67/147* (2013.01); *H04W 8/04* (2013.01)

(58) Field of Classification Search
CPC ........................................................ H04L 29/06
USPC ................................. 709/227–229; 370/352; 455/435.1–435.3
See application file for complete search history.

(56) References Cited

U.S. PATENT DOCUMENTS

| 2004/0121765 A1* | 6/2004 | Idnani et al. ............... 455/422.1 |
| 2004/0153667 A1* | 8/2004 | Kastelewicz et al. ......... 713/201 |
| 2007/0019634 A1* | 1/2007 | Fisher et al. .................. 370/352 |
| 2007/0280453 A1* | 12/2007 | Kelley et al. ............. 379/201.01 |
| 2007/0298794 A1* | 12/2007 | Cho ........................... 455/435.1 |
| 2008/0305811 A1* | 12/2008 | Cai et al. ....................... 455/461 |
| 2009/0190577 A1* | 7/2009 | Allen et al. .................... 370/352 |

\* cited by examiner

*Primary Examiner* — Shirley Zhang
(74) *Attorney, Agent, or Firm* — Duft Bornsen & Fettig, LLP

(57) ABSTRACT

A network element for use in an IMS network is disclosed herein. The network element includes a communication interface operable to receive a SIP request message from a communication device, such as an SIP invite. The network element also includes a communication processor operable to process the SIP request message, extract registration information from a header of the SIP request message, and update a registration of the communication device with the IMS network based on the registration information.

10 Claims, 6 Drawing Sheets

| SIP Method | SIP Registration Refresh Request Header Data Fields: | Existing Header Associated With Method 302 | CR/LF | Message Body |
|---|---|---|---|---|
| | *303* | | | |
| *302* | -Call ID<br>-CSeq Number<br>-Contact Address(es)<br>-Expires | *309* | *310* | *311* |

*300*

DEVICE REGISTRATION IN AN IMS NETWORK

BACKGROUND OF THE INVENTION

1. Field of the Invention

The invention is related to the field of communication networks and, in particular, to systems and methods for maintaining registrations of communication devices within an IP Multimedia Subsystem (IMS) network.

2. Statement of the Problem

The Session Initiation Protocol (SIP) is an application-layer control protocol for creating, modifying, and terminating sessions with one or more users. These sessions include Internet telephone calls, multimedia distribution, and multimedia conferences. SIP invitations create sessions that allow the users to agree on a set of compatible media types based on session descriptions configurable within the protocol. When a user desires a session with another user in a SIP based network, such as the IMS, the network discovers the host where the destination user may be reached. This discovery process is often performed by SIP network elements such as proxy servers and redirect servers. These network elements receive requests from originating users, locate destination users, and forward the requests to establish links between the users.

Before the links between users can be established, the users register with the network. The registrations create "bindings" in a location service for a particular domain that associates an address-of-record uniform resource identifier (URI) with one or more contact addresses. When a network element for the domain receives a request with a Request-URI that matches an address-of-record, the network element forwards the request to the contact addresses registered to that address-of-record.

Registration is performed by users sending a REGISTER request to a user agent server (UAS) known as a registrar. In IMS, this function may be performed by a home subscriber server (HSS). The REGISTER request adds, removes, and/or queries bindings. For example, a REGISTER request from a user may add a new binding between an address-of-record and one or more contact addresses. A REGISTER request may also remove previous bindings upon expiration or query bindings to determine which bindings are currently in place for an address-of-record.

The REGISTER request also establishes a time limit for the registration. For example, the REGISTER includes an "expires" header field that is used to establish a desired duration for registration of the user's device with the network. If no expires header parameter is provided in the "contact SIP header" and no "expires SIP header" exists, the network establishes a default expiration for the bindings at 3600 seconds, unless updated, or "refreshed". Once a binding expires for a present address of record, the user is no longer able to receive incoming calls from the network at its present contact address.

Each device is responsible for refreshing the bindings that it has previously established. A device should not refresh bindings set up by other devices. The 200 (OK) response from the registrar contains a list of contact fields enumerating all current bindings. The device compares each contact address to see if it created the contact address, using comparison rules (see e.g., section 19.1.4 of RFC 3261). If so, the device updates the expiration time interval according to the expires parameter or, if absent, the Expires field value. The device then issues a REGISTER request for each of its bindings before the expiration interval has elapsed. It may combine several updates into one REGISTER request.

A problem exists with the present REGISTER request when it is used to update the expiration time interval due to the number of REGISTER requests being processed. A network may have hundreds of thousands of devices registered at any given time. Thus, a network element may be continuously bombarded with REGISTER requests that are used to merely refresh an already registered device. These requests may cost the network element precious clock cycles that could be better used processing other message traffic.

SUMMARY OF THE SOLUTION

Embodiments of the invention solve the above and other related problems by providing a network element of an IMS network that includes a communication interface operable to receive a SIP request message from a communication device. The network element also includes a communication processor that is communicatively coupled to the communication interface to process the SIP request message, extract registration information from a header of the SIP request, and update a registration of the communication device with the IMS network based on the registration information. For example, once a registration has been established by communication device, a communication device may update the registration using messages other than REGISTER requests via a new registration refresh header, thereby avoiding unnecessary message traffic. Examples of such messages include an SIP INVITE, a SIP 183 Progress, a SIP 180 Ringing, a SIP 200 OK(PRACK), a SIP UPDATE, a SIP 200 OK(UPDATE), a SIP 200 OK(INVITE), a SIP PRACK, a SIP ACK, a SIP 200 OK(re-INVITE) or a SIP re-INVITE. Additionally, the network element may generate and transfer a SIP response message to a communication device to indicate a result of an attempted registration refresh by the communication device.

In one embodiment, a communication device, operable to communicate with an IMS network, includes a communication interface operable to exchange data with the IMS network. The communication device also includes a communication processor that is operable to transfer a REGISTER request to the IMS network to register with the IMS network and initiate a timer that establishes a new registration duration with the IMS network. The communication processor is also operable to format a new header of a SIP request or response message to a communication device. The header may include registration information used in maintaining the registration with the IMS network, such as the result of an attempted registration refresh by the communication device.

In another embodiment, a method of continuing a registration of a communication device with an IMS network includes receiving a SIP request message from the communication device requesting a session and determining a registration status of the communication device with the IMS network by determining a remaining registration duration of the communication device with the IMS network. The method also includes processing header information within the SIP request message to extract registration information and increasing the registration duration based on the extracted registration information.

Advantages of the invention include reducing message traffic caused by continuous registration refresh messages and the related processing necessary to route the registration refresh messages to the correct destinations. For example, registration information of the present invention is "piggybacked" with necessary SIP call processing messages already being routed.

DESCRIPTION OF THE DRAWINGS

The same reference number represents the same element or same type of element on all drawings.

DETAILED DESCRIPTION OF THE INVENTION

FIGS. 1-6 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
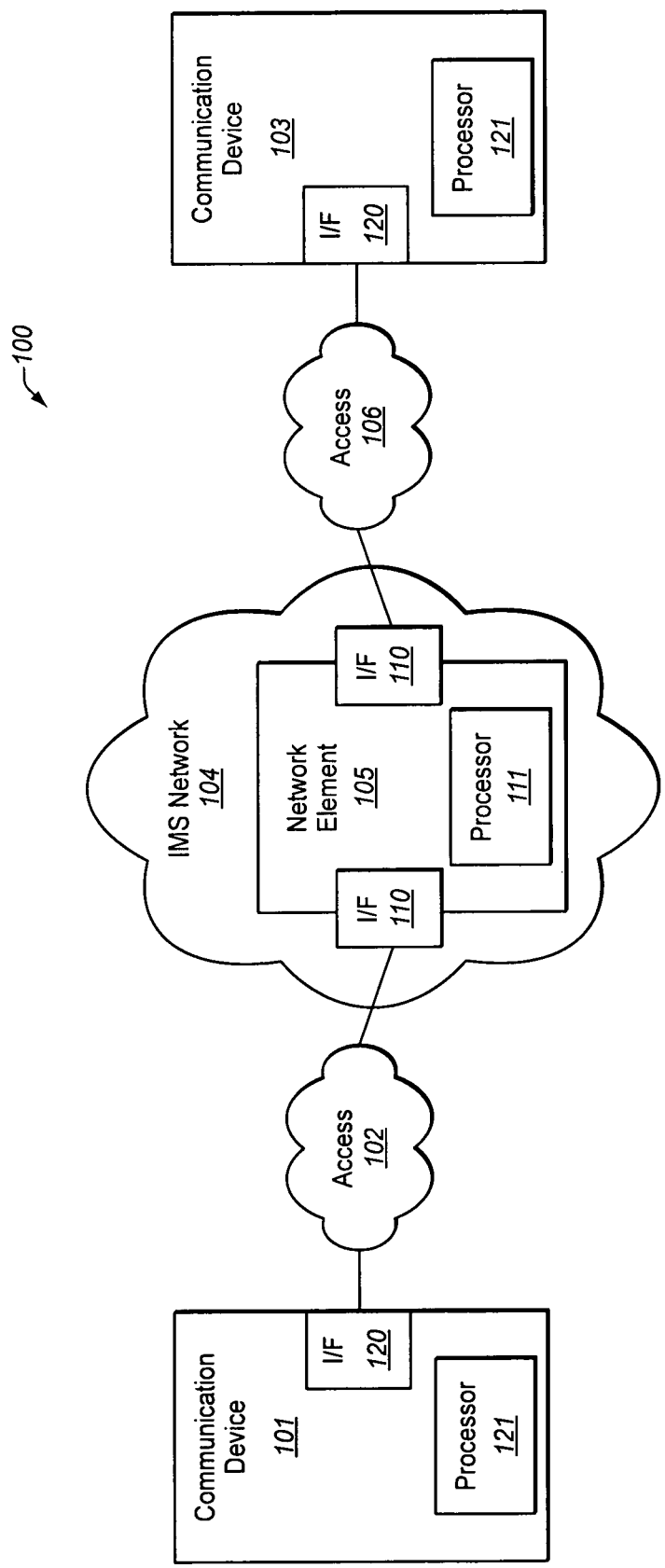
FIG. 1 illustrates a communication network in an exemplary embodiment of the invention.

FIG. 1 illustrates a communication network 100 in an exemplary embodiment of the invention. The communication network 100 is a SIP based communication network that allows users to communicate with each other via their respective communication devices 101 and 103 using communication standards defined by SIP, such as those stated in RFC 3261 maintained by the Network Working Group of the Internet Engineering Task Force. More particularly, the communication network 100 may include an IMS network architecture 104 operable using SIP communications.

SIP is a signaling technique that uses messages to "build up" and "tear down" communication links between users. Generally, SIP messages are either requests from a client to a server or responses from a server to a client. To initiate a session of communications, a user of the communication device 101 may transfer a SIP request to the IMS 104 via the access network element 102. The request includes a SIP "method", such as REGISTER for registering contact information, INVITE for inviting other users into a communication session, ACK for acknowledgement, CANCEL for terminating a session transaction, BYE for terminating sessions, and OPTIONS for querying servers about their capabilities. Before the communication device 101 can establish communications with the communication device 103, the network element 105 ensures that the communication devices 101 and 103 are registered with the IMS 104.

The communication device 101 registers with the IMS 104 by generating a REGISTER request via the communication processor 121 and transferring the REGISTER request to the network element 105 through the access network 102 via the communication interface 120. The REGISTER request establishes a duration for a session of communications (e.g., a binding) with the IMS 104. The REGISTER request includes a header configured with information used in establishing the duration of the session. Alternatively, the network element 105 may establish a default session duration if no duration is specified in the REGISTER request. As each user is responsible for refreshing bindings that have been established, the communication device 101 previously updated the duration of the session with a registration request. If the binding expired before being refreshed, the network element 105 precluded the communication device 101 from the reception of future incoming calls through the IMS 104. Now, however, the communication device 101 may refresh or update the registration via other SIP messages that are used during typical SIP communications.

The communication device 101 may update the registration with the IMS 104 by "piggybacking" on other SIP methods. For example, when the communication device 101 originates a session with the current registration period about to expire, the communication processor 121 may include information used to update or extend the registration in a new SIP registration refresh header of the INVITE message before sending it to the network element 105. The network element 105 includes a communication interface 110 that receives the INVITE message, and other messages as necessary, where it may be processed by the communication processor 111 to establish the session with the communication device 103. In doing so, the network element 105 may also remove the SIP registration refresh header from the message and extract registration information from the SIP registration refresh header. Based on the extracted registration information, the network element 105 may extend the duration of the registration of the communication device 101 with the IMS 104. Generally, the network element 105 determines whether the registration refresh is to be authorized. In this regard, the registration refresh information in the SIP registration refresh header from the communication device 101 is a request that includes information used in the determination by the network element 105.

The SIP registration refresh header is not intended to be limited to simply INVITE messages. Rather, other SIP messages may include a SIP registration refresh header to update the registration of the communication device 101. For example, the SIP registration refresh header may be included in messages such as PRACK, UPDATE, 200 OK (UPDATE), ACK, reINVITE, and others that are typically sent to the network element 105 during a session. Similarly, the SIP registration refresh header may be included with messages from the communication device 103 to the network element 105. For example, the SIP registration refresh header may be included in messages, such as 183 Progress, 180 Ringing, 200 OK (PRACK), 200 OK (INVITE), 200 OK (reINVITE), UPDATE, 200 OK (UPDATE), that are transferred from the communication device 103 to the network element 105 when establishing communications with the communication device 101.

The SIP registration refresh header may include certain data that, when processed by the network element 105, extends the duration of the session. An example of such a header data includes a call ID used in the initial registration of communication device 101. Other examples may include a command sequence number used in incrementing from a previous or initial registration, a contact that includes contact addresses of bindings with the address-of-record, and "expires" data to establish the new duration for those bindings.

Once processed by the network element 105, the information in contact header enumerates current bindings such that each contact address contains expires data indicating the expiration period chosen by network element 105. The network element 105 may, in this regard, generate a SIP response message that includes a result of the registration refresh in the SIP registration refresh result header. The SIP response message may then be transferred to the communication device 101.

Figure 2:
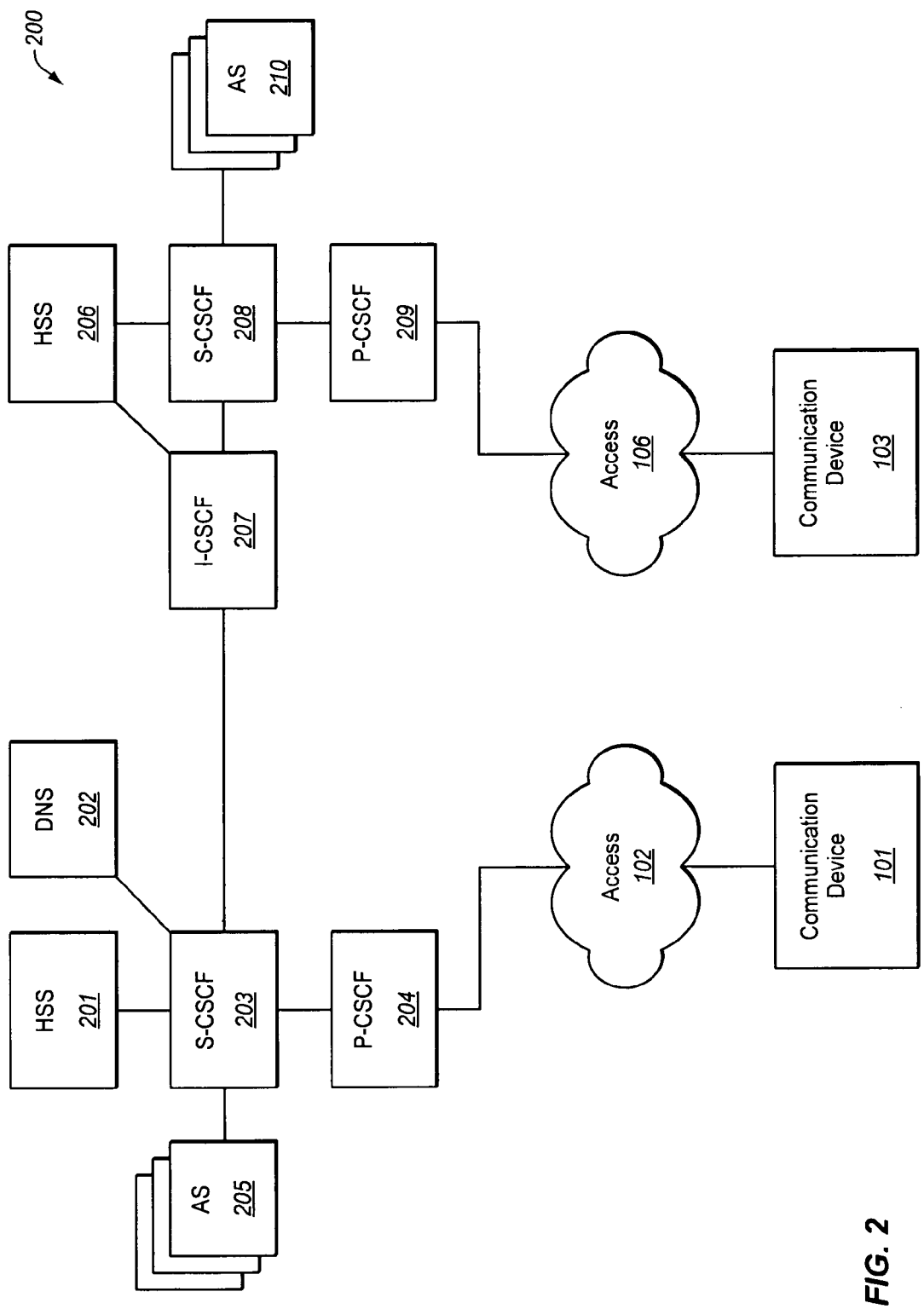
FIG. 2 illustrates a block diagram of an IMS network in an exemplary embodiment of the invention.

FIG. 2 illustrates block diagram of an IMS network 200 in an exemplary embodiment of the invention. In this embodiment, the communication device 101 initiates communications by transferring an INVITE message to the proxy call session control function (P-CSCF) 204. The INVITE message may include a new registration expiration interval that is used to extend the binding of the communication device 101. The P-CSCF 204 may contact the serving call session control function (S-CSCF) 203 such that the S-CSCF 203 may determine registration of the communication device 101 within the IMS network 200. In doing so, the S-CSCF 203 may contact the home subscriber server (HSS) 201 to retrieve the user's profile for the communication device 101. The user's profile may be used to apply service logic via the application servers 205. The S-CSCF 203 may then retrieve an address of the communication device 103 to forward the INVITE message to the device.

Prior to transferring the INVITE message to the communication device 103, the S-CSCF 203 may remove the SIP registration refresh header from the INVITE message since the downstream network elements do not need to know this information. The S-CSCF 203 may extract registration information from the header used in extending the duration of the session. For example, the HSS 201 may maintain registrations of the communication device 101. The S-CSCF 203 may transfer the extracted registration information to the HSS 201 such that the HSS 201 may increase the duration of the registration.

In transferring the INVITE message to the communication device 103, the S-CSCF 203 may forward the INVITE message to an interrogating call session control function (I-CSCF) 207. The I-CSCF 207 may process the INVITE message by identifying S-CSCF 208 serving the communication device 103. Once located, the I-CSCF 207 may transfer the INVITE message to the appropriate S-CSCF 208 of the communication device 103 such that its subscriber profile may be retrieved by the HSS 206 of the communication device 103 and service logic may be applied via application servers 210. The S-CSCF 208 may then transfer the INVITE message to the communication device 103 to initiate communications between the communication device 101 and the communication device 103.

Once received, the communication device 103 may transfer a response to the INVITE message to the S-CSCF 208. In doing so, the communication device 103 may configure the response with a SIP registration refresh header in a manner similar to that performed by the communication device 101. As with the S-CSCF 203, the S-CSCF 208 may remove the SIP registration refresh header, extract registration information pertaining to the communication device 103, and transfer the registration information to the HSS 206 to update the registration(s) of the communication device 103. The S-CSCF 208 may alert the communication device 103 by ringing the device via the P-CSCF 209 and the access network 106. Assuming the user of the communication device 103 desires communication with the user of the communication device 101, the network connects the two communication devices.

A SIP registration refresh header ("SIP Reg-Refresh header") may be configured with an INVITE and other messages in order to inform the S-CSCF 203 at the home network that a registration refresh is to be performed in addition to call setup. Examples of other messages that may inform the S-CSCF 208 that a registration refresh is requested by the communication device 103 include 183 Progress, 180 Ringing, 200 OK (INVITE). The SIP registration refresh header may include registration refresh contact data containing contact addresses for bindings with an address-of-record that the communication device 101 wishes refreshed. Additionally, the SIP registration refresh header may include registration refresh expires data that indicates the duration in which the bindings for all contact addresses not containing the expires header parameter are to be refreshed. The SIP registration refresh header may also include other data, such as registration refresh Call-ID data containing the Call-ID used in initial registration, and registration refresh command sequence data containing the "CSeq" number incremented from a previous registration refresh or an initial registration.

Delivering the session initiation request to communication device 103 is not dependent upon a registration refresh. Rather, it is dependent upon an existing registration of the device with the network. As long as the communication device 103 is registered with the network, then a session may proceed without the need of a registration refresh or even if a registration refresh fails.

The S-CSCF 203 may include a SIP registration refresh result header in a response message to the communication device 101. This header from the network to the communication device 101 may include the result of a registration refresh as determined by the network (e.g., the HSS 201). The SIP registration refresh result header may also include contact data that enumerates current bindings if a registration refresh is successful. Each contact address may contain expires data indicating the expiration period in seconds chosen by the registrar. If registration refresh is unsuccessful, an error code or other result code may be included in the result.

The communication device 101 may determine when it is appropriate to request an extension to a current registration duration. The communication device 101 may do so based on certain criteria, such as the percentage of registration time remaining, the amount of registration time remaining, a history of call activities. For example, if a percentage of time remaining in the registration breaches a threshold percentage, the communication device 101 may configure the SIP registration refresh header with an expires parameter that is processed by the network to extend the registration of the communication device 101. Although, other algorithms may be used in determining when a registration extension should be requested.

Figure 3:
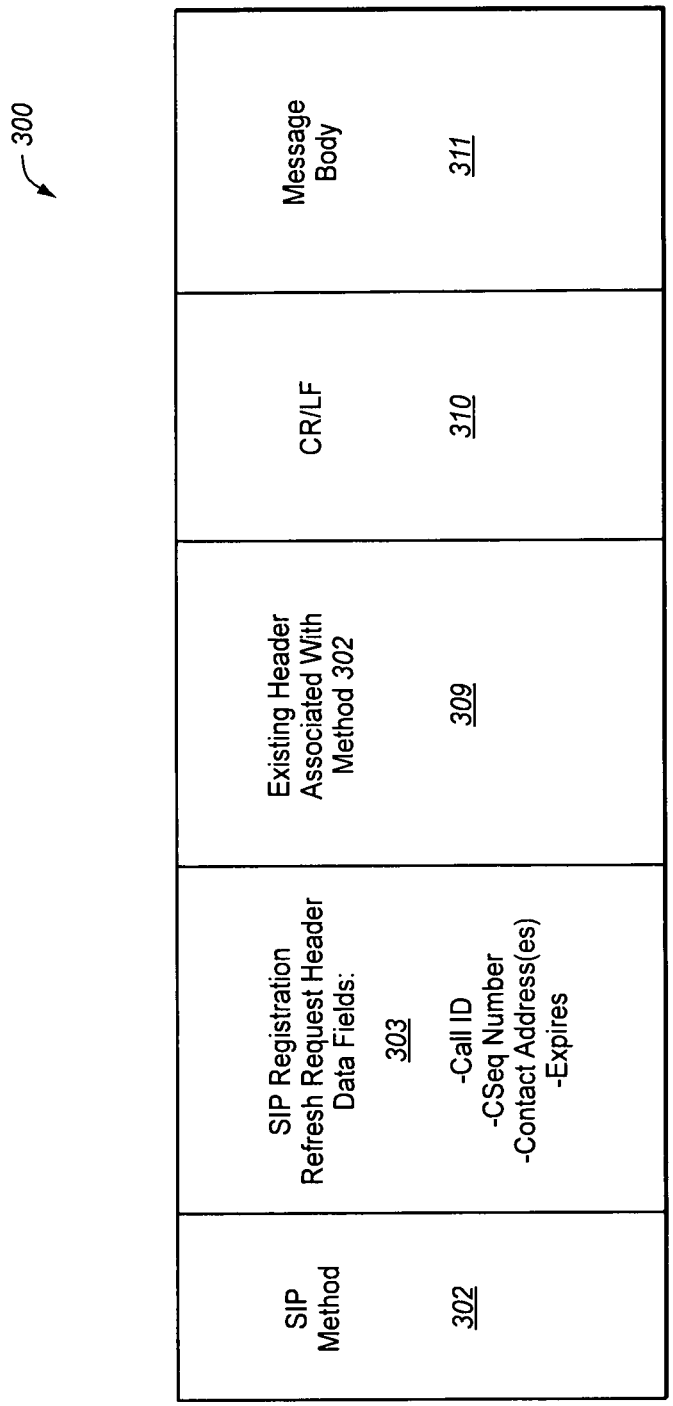
FIG. 3 illustrates a SIP request message with a header used in updating a registration in an exemplary embodiment of the invention.

FIG. 3 illustrates a SIP request message 300 with a SIP registration refresh header 303 used in updating a registration in an exemplary embodiment of the invention. In this embodiment, the SIP request message 300 includes a standard SIP method 302 configuration (e.g., INVITE, ACK, etc.). The method 302 is followed by the header 303, existing header fields 309 associated with the SIP method 302, a carriage return/linefeed 310, and the message body 311. As mentioned, registration updates were previously handled only by the REGISTER request methods which resulted in unnecessary messages.

The SIP registration refresh header 303 may include expires data that, when processed by an S-CSCF, may extend the duration of the session. Other SIP registration refresh header data may include a Call-ID data used in the initial registration of communication device 101, a command sequence (CSeq) number used to increment from a previous or initial registration, a contact address(es) that includes the contact address(es) of bindings with the address-of-record.

Although described with respect to the communication device 101 configuring the SIP registration refresh header 303, the invention is not intended to be limited to simply registration by a calling communication device. Rather, any communication device operating through the IMS network 200 may be operable to configure a SIP registration refresh header in a SIP request message. For that matter, the invention is not intended to be limited to simply request messages as SIP response messages may also include the SIP registration refresh header. Similarly, both SIP request and response messages can provide results of an attempted registration refresh. For example, when a server contacts a communication device, the server may generate a response message with a SIP registration refresh result header that includes the result of a registration extension or an error code.

Figure 4:
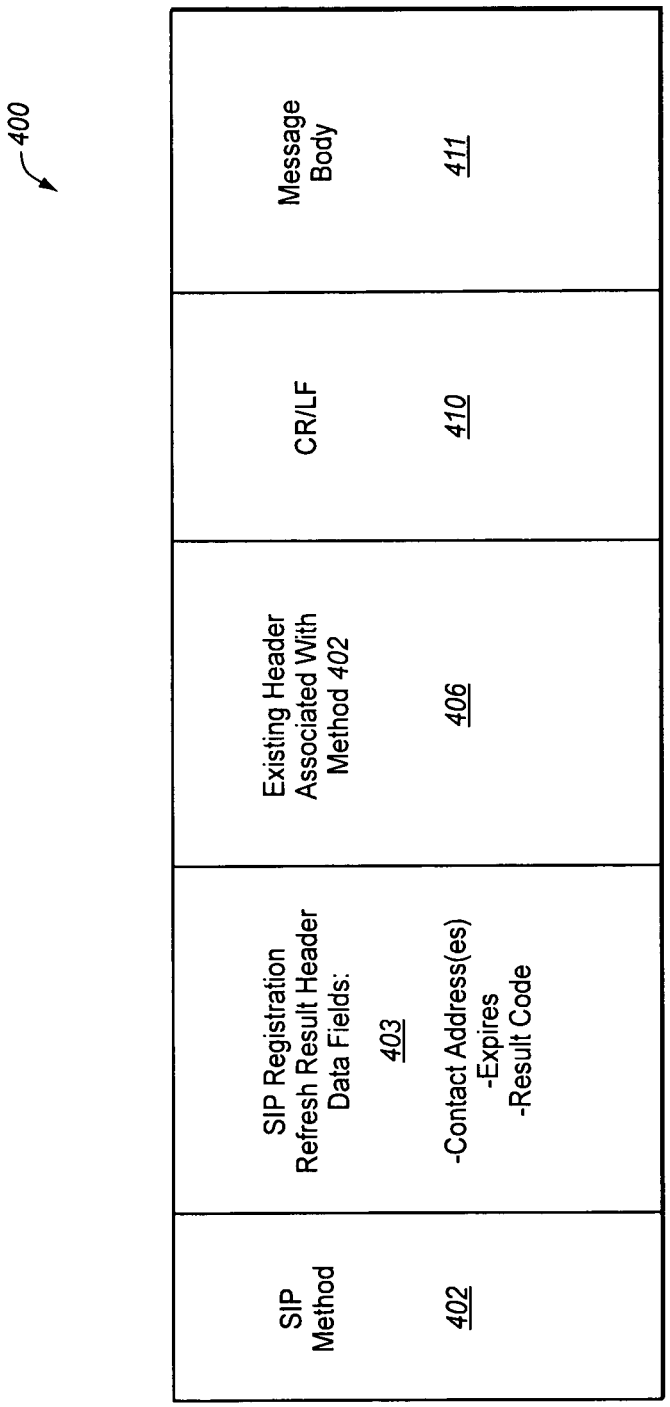
FIG. 4 illustrates a SIP response message with a header used in providing a registration result in an exemplary embodiment of the invention.

FIG. 4 illustrates a SIP response message 400 with a header 403 used in providing a result to a registration refresh request in an exemplary embodiment of the invention. In this embodiment, the SIP message 400 includes a standard SIP method 402 (e.g., INVITE, ACK, OPTIONS, BYE, CANCEL, or 200 OK). The method 402 is followed by the registration refresh result header 403, the existing header 406 that is associated with the method 402, a carriage return/linefeed 410, and the message body 411. The header 403 may be configured with SIP registration refresh result header data that may include the result of a registration refresh as determined by the network. For example, when the registration refresh data is processed by an S-CSCF 203, the S-CSCF 203 (or another network element) may in turn generate a result of the registration refresh. That is, the S-CSCF-203 may transfer information to the communication device 101 to inform the device that the registration refresh was successful or provide an error stating why the registration refresh was not successful. Such information may be communicated via a result or error code in the header 403. Other information of the header 403 may include contact data that enumerates current bindings if a registration refresh is successful and expires data indicating the expiration period in seconds chosen by the registrar.

Figure 5:
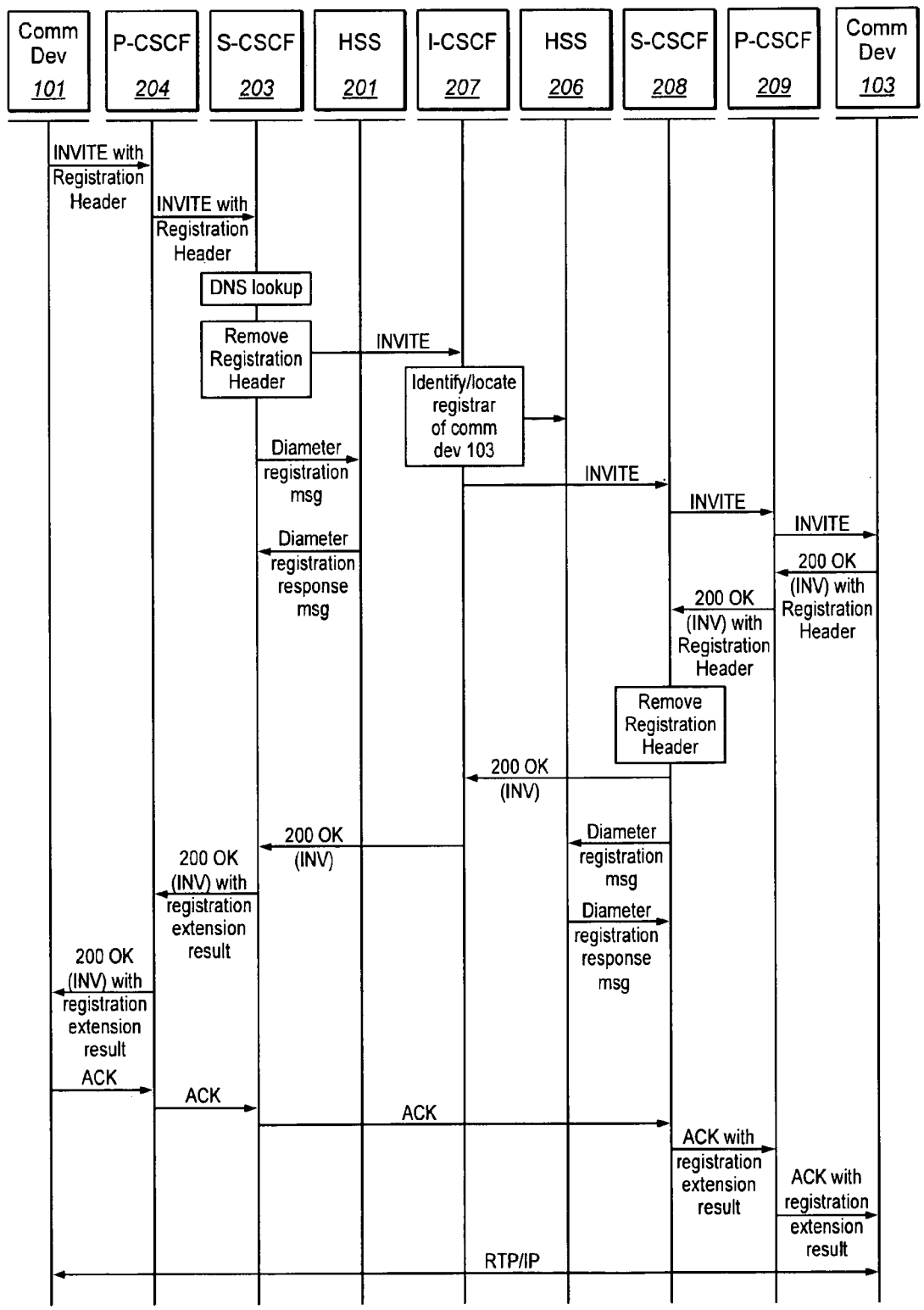
FIG. 5 illustrates a message diagram used in an IMS network in an exemplary embodiment of the invention.

FIG. 5 illustrates a message diagram used in the IMS network 200 in an exemplary embodiment of the invention. In this embodiment, the message diagram illustrates an IMS to IMS call without a provisional response. Communications initiate when the communication device 101 generates and includes a SIP registration refresh header in an INVITE message. In doing so, the communication device 101 configures the expires data with the SIP registration refresh header. The communication device 101 then transfers the INVITE message to the S-CSCF 203 (e.g., via the P-CSCF 204) to initiate a call with the communication device 103. The S-CSCF 203 performs a DNS lookup for the communication device 101, removes the SIP registration refresh header 303, and forwards the INVITE message to the I-CSCF 207 to identify the S-CSCF and locate the communication device 103. The S-CSCF 203 may delete the SIP registration refresh header 303 before proxying the message because "downstream" network elements and the other communication devices, such as the communication device 103, do not require knowledge of a registration refresh being performed by, e.g., the communication device 101. The S-CSCF 203 may notify the HSS 201 with registration information (e.g., the expires parameter) of the SIP registration refresh header 303 via a Diameter registration message. The HSS 201 may thereby extend the registration expiration period of the communication device 101 according to the expires parameter and notify the S-CSCF 203 of the successful registration extension in a response Diameter message.

In the meantime, the I-CSCF 207 transfers the INVITE to the S-CSCF 208 such that the S-CSCF 208 may INVITE the communication device 103 (e.g., via the P-CSCF 209) to the session with the communication device 101. The communication device 103 may respond with a 200 OK(INVITE) that employs a similar SIP registration refresh header 303. The communication device 103 transfers the 200 OK(INVITE) to the S-CSCF 208 (e.g., via the P-CSCF 209) for processing. The S-CSCF 208 removes the SIP registration refresh header and transfers the 200 OK(INVITE) to the S-CSCF 203. The S-CSCF 208 also transfers the registration information contained in the SIP registration refresh header 303 to the HSS 206 via a Diameter message. The HSS 206 may update the registration of the communication device 103 and respond to the S-CSCF 208 via a response Diameter message.

Once the S-CSCF 203 receives the 200 OK(INVITE), the S-CSCF 203 formats a SIP registration refresh result header 403 to the 200 OK(INVITE) in the SIP response message 400 notifying the communication device 101 of the registration extension result. For example, once the registration extension has been authorized by the HSS 201, the S-CSCF 203 may notify the communication device 101 (e.g., via the P-CSCF 204) of that successful registration extension.

The communication device 101 then generates and transfers an acknowledgment, or ACK, in response to the 200 OK(INVITE) where it is processed by the S-CSCF 208. The S-CSCF 208 in turn generates a SIP registration refresh result header 403 that is configured with the ACK for use by the communication device 103. The SIP registration refresh result header 403 that is generated by the S-CSCF 208 similarly includes information pertaining to the successful registration extension of the communication device 103.

Figure 6:
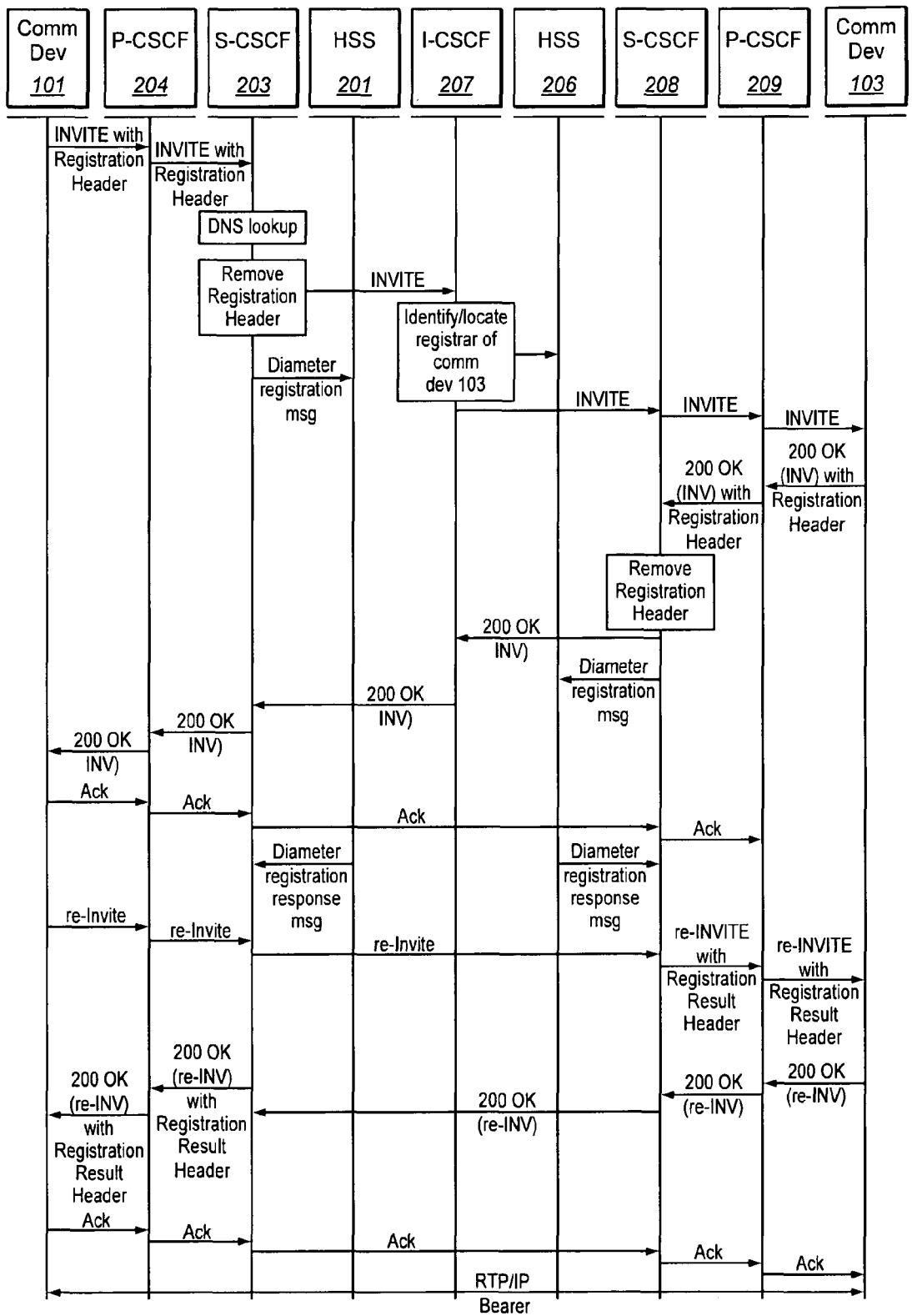
FIG. 6 illustrates another message diagram in an exemplary embodiment of the invention.

The message diagram of FIG. 5 merely represents one form of message flow that may include the SIP registration refresh headers described herein. The invention, however, is not intended to be limited to the message diagram of FIG. 5. For example, the communication device 103 may modify an IMS to IMS session through re-INVITEs. The delayed responses from the HSS (e.g., HSS 201 and HSS 206) can be included in SIP registration refresh result header in messages used for re_INVITE. FIG. 6 illustrates such a message flow when the S-CSCF 203 transfers a re-INVITE configured with the SIP registration refresh result header to the communication device 103.

The flow and processing of FIG. 6 is similar to that in FIG. 5 except for the delayed Diameter response from the HSS 201. For example, the S-CSCF 203 transfers a Diameter registration message including the registration information of the communication device 101 to the HSS 201. The HSS 201, however, does not initially respond with a Diameter message to the S-CSCF 203 because, in this embodiment, the HSS 201 is in an "overload condition". Instead, the HSS 201 transfers a Diameter message to the S-CSCF 203 after Ack messages have been transferred to the S-CSCF 208 and the S-PSCF 209 (e.g., after the overload condition subsides). Thereafter, the S-CSCF 203 configures a SIP registration refresh result header 403 with the 200 OK (re-INV) to inform the communication device 101 of the result of the attempted registration refresh. The HSS 206 performs in a similar manner by sending a Diameter message to the S-CSCF 208 which subsequently configures a SIP registration refresh result header 403 with the re-INVITE to the communication device 103.

Those skilled in the art should readily recognize that other message flows may exist with the communication devices 101 and 103 particularly since the SIP header may be configured with a variety of SIP request and response messages outside of the context of the SIP REGISTER request. Some non limiting examples of such messages include an INVITE, a 183 Progress, a 180 Ringing, a 200 OK(PRACK), an UPDATE, a 200 OK(UPDATE), a 200 OK(INVITE), a PRACK, an ACK, a 200 OK(re-INVITE), or a re-INVITE.

Although specific embodiments were described herein, the scope of the invention is not limited to those specific embodiments. The scope of the invention is defined by the following claims and any equivalents thereof.

We claim:

1. A communication device configured to communicate with an IMS network, the communication device comprising:
   a communication interface configured to exchange data with the IMS network; and
   a communication processor configured to transfer a Session Initiation Protocol (SIP) register request to the IMS network to register the communication device with the IMS network, wherein registration of the communication device is valid for a registration duration;
   the communication processor is configured to generate a SIP request for initiating a session in the IMS network, and to determine whether extension of the registration duration is requested within the communication device based on criteria, wherein the criteria include a percentage of registration time remaining, an amount of registration time remaining, and a history of call activities;
   the communication processor is configured to format a header of the SIP request with registration information that requests the extension of the registration duration for the communication device, and to transmit the SIP request to the IMS network.

2. The communication device of claim 1 wherein:
the SIP request comprises a SIP INVITE.

3. The communication device of claim 1 wherein:
the SIP request comprises a SIP UPDATE.

4. The communication device of claim 1 wherein:
the communication processor is configured to format the header of the SIP request with SIP registration refresh header data selected from a group consisting essentially of:
   data used in initial registration of the communication device;
   a command sequence number used to increment from a previous registration of the communication device;
   contact addresses of bindings with an address-of-record to be refreshed; and
   expiration data for updating the registration duration for the communication device.

5. The communication device of claim 1 wherein:
the communication processor is configured to receive a SIP response from the IMS network, and to process the SIP response to identify a result of the extension of the registration duration for the communication device.

6. A method of updating registration of a communication device in an IMS network, the method comprising:
   transferring a Session Initiation Protocol (SIP) register request from the communication device to the IMS network to register the communication device with the IMS network, wherein registration of the communication device is valid for a registration duration;
   generating, at the communication device, a SIP request for initiating a session in the IMS network;
   determining whether extension of the registration duration is requested within the communication device based on criteria, wherein the criteria include a percentage of registration time remaining, an amount of registration time remaining, and a history of call activities;
   formatting a header of the SIP request with registration information that requests the extension of the registration duration for the communication device; and
   transmitting the SIP request from the communication device to the IMS network.

7. The method of claim 6 wherein:
the SIP request comprises a SIP INVITE.

8. The method of claim 6 wherein:
the SIP request comprises a SIP UPDATE.

9. The method of claim 6 wherein formatting a header of the SIP request with registration information comprises:
   formatting the header of the SIP request with SIP registration refresh header data selected from a group consisting essentially of:
      data used in initial registration of the communication device;
      a command sequence number used to increment from a previous registration of the communication device;
      contact addresses of bindings with an address-of-record to be refreshed; and
      expiration data for updating the registration duration for the communication device.

10. The method of claim 6 further comprising:
receiving a SIP response in the communication device from the IMS network; and
processing the SIP response to identify a result of the extension of the registration duration for the communication device.

* * * * *